US012770933B2

(12) United States Patent
Park

(10) Patent No.: US 12,770,933 B2
(45) Date of Patent: Oct. 20, 2026

(54) BATTERY PACK

(71) Applicant: SAMSUNG SDI CO., LTD., Yongin-si (KR)

(72) Inventor: Sanghun Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 552 days.

(21) Appl. No.: 18/379,392

(22) Filed: Oct. 12, 2023

(65) Prior Publication Data

US 2024/0322262 A1 Sep. 26, 2024

(30) Foreign Application Priority Data

Mar. 26, 2023 (KR) ........................ 10-2023-0039352
Jun. 23, 2023 (KR) ........................ 10-2023-0080989

(51) Int. Cl.
*H01M 10/42* (2006.01)
*H01M 10/04* (2006.01)
(Continued)

(52) U.S. Cl.
CPC ..... *H01M 10/425* (2013.01); *H01M 10/0481* (2013.01); *H01M 50/528* (2021.01); *H01M 50/536* (2021.01)

(58) Field of Classification Search
CPC ........... H01M 10/425; H01M 10/0481; H01M 50/528; H01M 50/531; H01M 50/536; B23K 20/02; B23K 20/023; B23K 20/026
See application file for complete search history.

(56) References Cited

U.S. PATENT DOCUMENTS 6,409,866 B1 * 6/2002 Yamada .............. H10W 72/073 29/829
8,609,275 B2 * 12/2013 Park .................... H01M 50/503 429/158
(Continued)

FOREIGN PATENT DOCUMENTS

CN 101645516 A * 2/2010 .......... H01M 10/049
JP 2016048807 A * 4/2016
(Continued)

OTHER PUBLICATIONS

Extended European Search Report mailed Aug. 7, 2024 for corresponding EP Patent Application No. 24154543.3.
Korean Notice of Allowance dated Aug. 18, 2025.

*Primary Examiner* — Nicholas A Smith
*Assistant Examiner* — Ryan Patrick Murphy
(74) *Attorney, Agent, or Firm* — Lee IP Law, P.C.

(57) ABSTRACT

A battery pack includes a battery cell, the battery cell including a first base material, a protection circuit electrically connected to the battery cell, the protection circuit including a second base material, and a conductive member continuously connecting the first base material of the battery cell to the second base material of the protection circuit, the conductive member including a first metal defining a core, and a second metal defining a shell on an outer side of the core, the second metal including a compression crack at least in a lead-in front end thereof facing the first base material and the second base material, and the first metal extending through the compression crack of the second metal to contact and diffusion bond with the first base material and the second base material.

12 Claims, 6 Drawing Sheets

(51) Int. Cl.

| | |
|---|---|
| ***H01M 50/528*** | (2021.01) |
| ***H01M 50/536*** | (2021.01) |

(56) References Cited

U.S. PATENT DOCUMENTS

| | | | | |
|---|---|---|---|---|
| 9,660,131 | B2 | 5/2017 | Fukushima et al. | |
| 10,243,184 | B1 | 3/2019 | Harris, III | |
| 10,589,502 | B2 | 3/2020 | Ishimatsu | |
| 11,183,743 | B2 | 11/2021 | Park | |
| 12,412,934 | B2 * | 9/2025 | Park | H01M 10/425 |
| 2011/0123836 | A1 | 5/2011 | Jang | |
| 2013/0220540 | A1 | 8/2013 | Fukushima et al. | |
| 2015/0044527 | A1 | 2/2015 | Neudecker et al. | |
| 2020/0328143 | A1 * | 10/2020 | Marinov | H01P 5/04 |
| 2020/0381696 | A1 | 12/2020 | Park | |
| 2020/0403299 | A1 * | 12/2020 | Gupta | H01Q 1/2283 |
| 2023/0216097 | A1 * | 7/2023 | Park | H01M 10/4257<br>429/9 |
| 2025/0062261 | A1 * | 2/2025 | Stahr | H10W 72/90 |

FOREIGN PATENT DOCUMENTS

| | | | | |
|---|---|---|---|---|
| JP | 6395208 | B2 | 9/2018 | |
| JP | 6959311 | B2 | 10/2021 | |
| JP | 2021-180311 | A | 11/2021 | |
| JP | 2022120925 | A * | 8/2022 | H01M 50/502 |
| KR | 1020110058646 | A | 6/2011 | |
| KR | 1020110082604 | A | 7/2011 | |
| KR | 1020140110181 | A | 9/2014 | |
| KR | 10-2016-0030278 | A | 3/2016 | |
| KR | 1020200137742 | A | 12/2020 | |
| WO | WO 2022/009396 | A1 | 1/2022 | |

* cited by examiner

BATTERY PACK

CROSS-REFERENCE TO RELATED APPLICATIONS

The present application claims priority and the benefit of Korean Patent Application No. 10-2023-0039352, filed on Mar. 26, 2023, in the Korean Intellectual Property Office, and Korean Patent Application No. 10-2023-0080989, filed on Jun. 23, 2023, in the Korean Intellectual Property Office, the entire disclosures of which are incorporated herein by reference.

BACKGROUND

1. Field

One or more embodiments relate to a battery pack, and more particularly, to a coupling structure of a conductive member to electrically connect a battery cell to a protection circuit in a battery pack.

2. Description of the Related Art

In general, pouch-type secondary battery cells operate as originally intended based on electrical connections with protection devices or systems of various application electronic devices. An electrical connection between a battery cell and a protection device or system may be implemented by, e.g., soldering, welding, etc.

In soldering, a base material is not melted and a solder is melted and spread onto the base material, such that two base materials are bonded together through the solder. In welding, base materials are melted and bonded to each other. Use of soldering or welding in a secondary battery depends on materials to be electrically connected.

SUMMARY

According to one or more embodiments, a battery pack may include a battery cell, a protection circuit electrically connected to the battery cell, and a conductive member continuously connecting a first base material to a second base material to form a current path of the battery cell between the battery cell and the protection circuit, in which the conductive member includes a first metal forming a core and a second metal forming a shell on an outer side of the core in which a compression crack is formed at least in a lead-in front end thereof facing the first base material and the second base material, and the first metal forms a diffusion bond with the first base material and the second base material through the compression crack of the second metal.

The first metal may have a diffusion distance by which the first metal permeates toward inner sides of the first base material and the second base material.

The second metal may have a high-temperature stability strength or melting point greater than a high-temperature stability strength or melting point of the first metal.

The first metal may have lead, and the second metal may have nickel.

The second metal may have a compression crack caused by a brittle fracture according to compression between the first base material and the second base material.

The second metal may not be thermally fused with the first metal in the diffusion bond of the first metal with the first base material and the second base material.

The diffusion bond of the first metal with the first base material and the second base material may be formed at a temperature less than the melting point of the second metal.

The second metal may have different values of surface roughness along an outer side of the first metal.

A permeation projection having a relatively high surface roughness may be formed in a lead-in front end of the second metal facing the first base material or the second base material.

A permeation projection may be formed in a lead-in front end of the second metal facing the first base material or the second base material.

According to one or more embodiments, a method of manufacturing a battery pack may include forming a battery cell, the battery cell including a first base material, forming a protection circuit, the protection circuit including a second base material, and electrically connecting the battery cell to the protection circuit via a conductive member, such that the conductive member continuously connects the first base material of the battery cell to the second base material of the protection circuit, the conductive member including a first metal forming a core, and a second metal forming a shell on an outer side of the core in which a compression crack is formed at least in a lead-in front end thereof facing the first base material and the second base material, the first metal forming a diffusion bond with the first base material and the second base material through the compression crack of the second metal.

The compression crack of the second metal may be caused by a brittle fracture according to compression between the first base material and the second base material.

The me diffusion bond of the first metal with the first base material and the second base material may be formed at a temperature less than a melting point of the second metal.

BRIEF DESCRIPTION OF THE DRAWINGS

Features will become apparent to those of skill in the art by describing in detail exemplary embodiments with reference to the attached drawings, in which.

DETAILED DESCRIPTION

Figure 1:
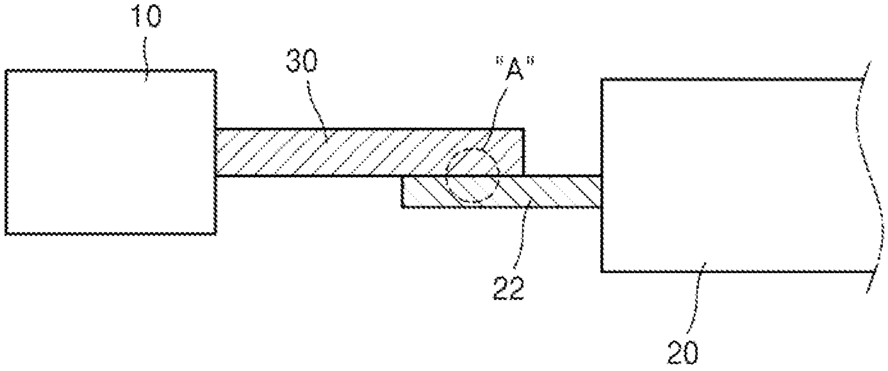
FIG. 1 shows a connection structure between an electrode tab and a protection circuit of a battery cell in a battery pack according to some embodiments.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

When a portion is referred to as "includes" a component, the portion may not exclude another component but may further include another component unless stated otherwise. More specifically, it should be understood that the term "include", "have", "comprise" or the like used herein is to indicate the presence of features, numbers, steps, operations, components, parts, or a combination thereof described in the specifications, and does not preclude the presence or addition of one or more other features, numbers, steps, operations, components, parts, or a combination thereof.

Singular forms include plural forms unless expressly indicated otherwise contextually. In addition, the shapes and sizes of components in the drawings may be exaggerated for clearer description.

Figure 2:
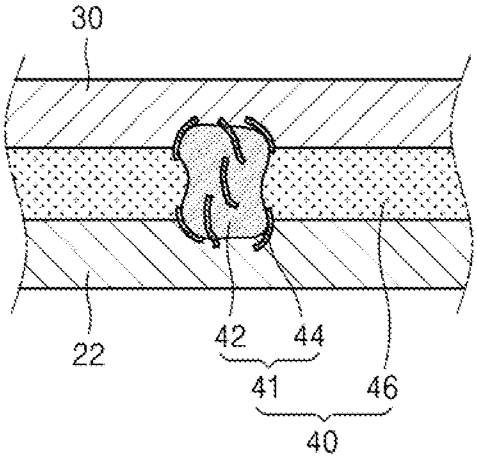
FIG. 2 is an enlarged view of portion "A" in FIG. 1, showing that a first metal is diffusion-spread to a first base material and a second base material after passing through a brittle-fractured second metal according to some embodiments.
Figure 3:
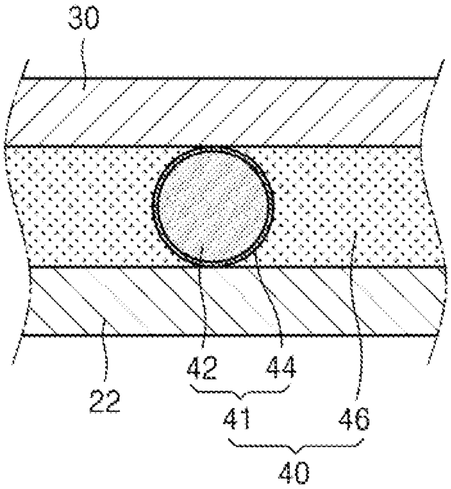
FIG. 3 shows an initial arrangement structure before formation of a bonding structure shown in FIG. 2, according to some embodiments.
Figure 4:
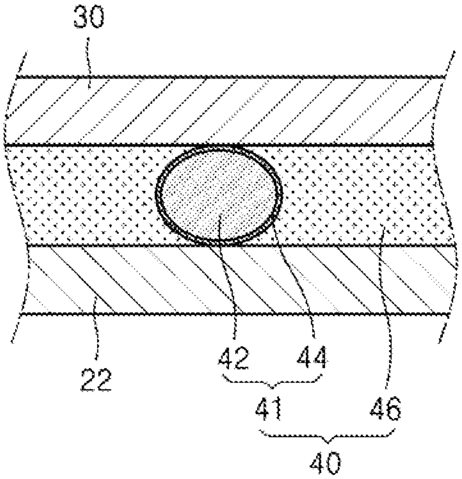
FIG. 4 shows a state where a metal ball included in a conductive member is primarily deformed by heating and pressing a first base material and a second base material in FIG. 3, according to some embodiments.
Figure 5:
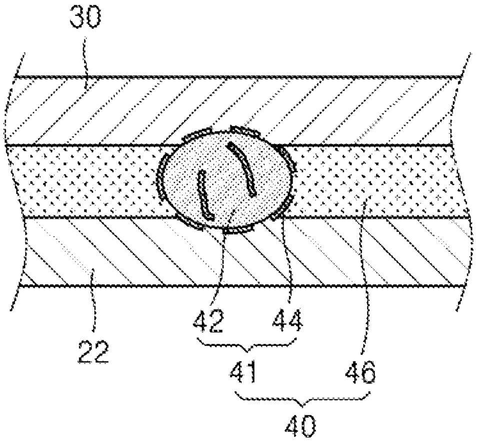
FIG. 5 shows a state where a second metal forming a metal ball included in a conductive member is brittle-fractured in FIG. 4, according to some embodiments.
Figure 6:
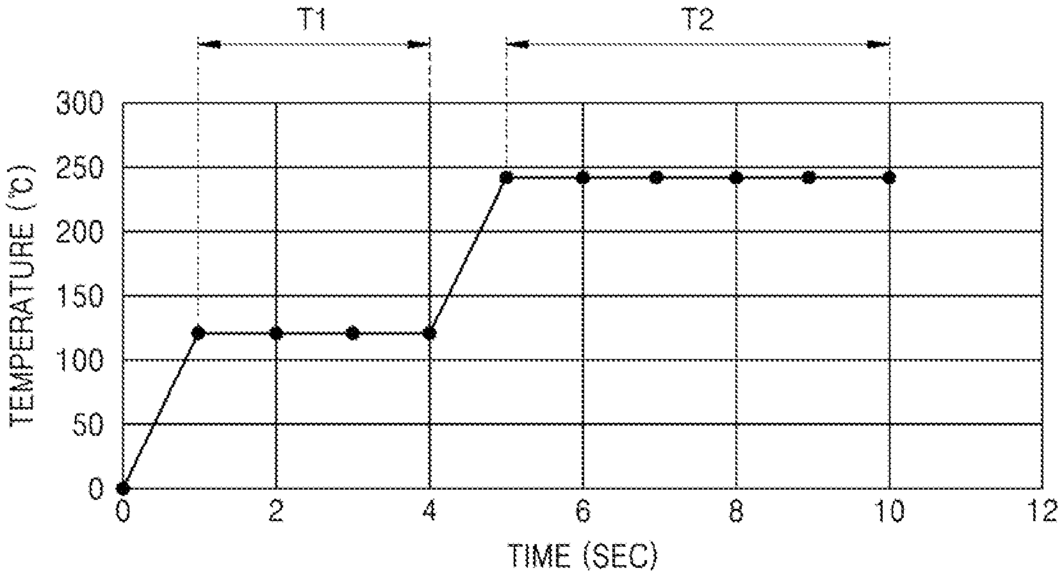
FIG. 6 is a graph showing an example of a change in time and temperature in a soldering process of a conductive member according to the disclosure, according to some embodiments.

FIG. 1 shows a schematic connection structure between an electrode tab and a protection circuit of a battery cell in a battery pack, according to some embodiments. FIG. 2 is an enlarged view of portion "A" shown in FIG. 1, showing that first metal is diffusion-spread to a first base material and a second base material after passing through brittle-fractured second metal, according to some embodiments. FIG. 3 shows an initial arrangement structure before formation of a bonding structure shown in FIG. 2, according to some embodiments. FIG. 4 shows a state where a metal ball included in a conductive member is primarily deformed by heating and pressing a first base material and a second base material in FIG. 3, according to some embodiments. FIG. 5 shows a state where second metal forming a metal ball included in a conductive member is brittle-fractured in FIG. 4, according to some embodiments. FIG. 6 is a graph showing an example of a change in time and temperature in a soldering process of a conductive member according to the disclosure, according to some embodiments.

Referring to FIGS. 1 to 6, a battery pack according to some embodiments may include a battery cell 20, a protection circuit 10, and a conductive member 40.

The battery cell 20 may include a cell structure having a housing in which a positive electrode material, a negative electrode material, a separator, and an electrolyte are accommodated. The battery cell 20 may be formed by stacking a plurality of cells.

The protection circuit 10 may be electrically connected to the battery cell 20. The protection circuit 10 may serve as a controller that effectively controls charging and discharging of the battery cell 20. For example, a connector part of the protection circuit 10 may be a second base material 30 that is electrically connected to the battery cell 20. For example, as illustrated in FIG. 1, the battery cell 20 may include an electrode tab (i.e., a first base material 22), so the connector of the protection circuit 10 (i.e., the second base material 30) and the electrode tab of the battery cell 20 (i.e., the first base material 22) may be electrically connected to each other.

As illustrated in FIG. 2, the conductive member 40 may be a member that continuously connects the first base material 22 to the second base material 30 to form a current path between the battery cell 20 and the protection circuit 10, e.g., the conductive member 40 may extend continuously along an entire interface between the first base material 22 and the second base material 30. The conductive member 40 may include a binder 46 and a plurality of metal balls 41 mixed with each other inside the binder 46.

In detail, the binder 46 may include a synthetic resin, e.g., a thermosetting resin or a thermoplastic resin. A melting temperature of the binder 46 may be about 100° C., which is greater than a melting temperature of a first metal 42 in the metal balls 41.

Each of the metal balls 41 may include a first metal 42 and a second metal 44. The first metal 42 may form a core of the metal ball 41, and may include, e.g., lead (Pb). The second metal 44 may form a shell on an outer side of the core, e.g., on an outer side of the first metal 42.

In the second metal 44, a compression crack may be generated at least in a lead-in front end facing the first base material 22 and the second base material 30. The first metal 42 may form diffusion-bonding with the first base material 22 and the second base material 30 through the compression crack of the second metal 44. The first metal 42 may have a diffusion distance by which the first metal 42 permeates toward inner sides of the first base material 22 and the second base material 30. According to the diffusion distance, the conductive member 40 may form a firm coupling structure with the first base material 22 and the second base material 30.

The second metal 44 may have a high temperature stability strength or melting point greater than the first metal 42. For example, the second metal 44 may include nickel (Ni). The compression crack may be generated in the second metal 44 due to a brittle fracture according to compression between the first base material 22 and the second base material 30.

In diffusion bonding of the first metal 42 with the first base material 22 and the second base material 30, the second metal 44 may not be thermally fused with the first metal 42. A fusion point difference between the first metal 42 and the second metal 44 may be sufficiently large such that an alloy thereof may not be formed. Diffusion bonding of the first metal 42 with the first base material 22 and the second base material 30 may be performed at a temperature less than the melting point of the second metal 44.

A permeating projection may be formed in a lead-in front end of the second metal 44 facing the first base material 22 or the second base material 30. That is, the second metal 44 may have different values of surface roughness along the outer side of the first metal 42. A permeating projection having a relatively high surface roughness may be formed in a lead-in front end of the second metal 44 facing the first base material 22 or the second base material 30. The permeating projection may better destroy an oxide film formed on surfaces of the first base material 22 and the second base material 30, thus helping diffusion bonding of the first metal 42 to be performed more smoothly.

Hereinbelow, a working effect of a battery pack including the above-described components will be described in detail with an example of a process of coupling the first base material 22 to the second base material 30 by using the conductive member 40. A process of electrically connecting the first base material 22 to the second base material 30 will be described with reference to FIGS. 2-5, while stages are performed in the order of FIG. 3, FIG. 4, FIG. 5, and FIG. 2.

As shown in FIG. 3, the conductive member 40 may be arranged between the first base material 22 and the second base material 30. The first base material 22 may be, e.g., an electrode tab of the battery cell 20 shown in FIG. 1. The second base material 30 may be, e.g., the connector part of the protection circuit shown 10 in FIG. 1. The conductive member 40 may include the metal balls 41 dispersed within the binder 46, such that the binder 46 may contact (e.g., directly contact) facing surfaces of the first base material 22 and the second base material 30, and the second metal 44 of the metal ball 41 may contact (e.g., directly contact) facing surfaces of the first base material 22 and the second base material 30. For example, at this stage, the second metal 44 may cover continuously an entire surface of each of the first metal 42 of the metal ball 41.

As shown in FIG. 4, the first base material 22 and the second base material 30 may be pressed in a direction close to each other and may be heated at the same time. For example, the first base material 22 and the second base material 30 may be pressed toward each other (with the conductive member 40 therebetween) while simultaneously being heated. Thus, physical properties of the binder 46 of the conductive member 40 may be deformed, such that the binder 46 may be slightly contracted (e.g., to have a smaller thickness between the first base material 22 and the second base material 30). Further, the metal ball 41 in the conductive member 40 may be slightly deformed by pressure (e.g., to have a shape with a decreased radius between the first base material 22 and the second base material 30).

As shown in FIG. 5, an additional pressure may be applied, such that the second metal 44 forming the shell structure of the metal ball 41 of the conductive member 40 may be brittle-fractured to form compression cracks therein, e.g., exposing some of the first metal 42 of the metal ball 41. An oxide film formed on the surfaces of the first base material 22 and the second base material 30 may be destroyed by the compression crack of the second metal 44 formed as a result. Subsequently, the first metal 42 may be diffused to the first base material 22 and the second base material 30 through the compression crack of the second metal 44 to form a diffusion bond.

Finally, as shown in FIG. 2, the first metal 42 may secure a diffusion distance through the compression crack of the second metal 44, e.g., the first metal 42 may diffuse a predetermined distance into each of the first base material 22 and the second base material 30 through the compression crack of the second metal 44. Therefore, a firm diffusion bond may be formed between the first base material 22 and the second base material 30 through the first metal 42 of the conductive member 40.

Referring to FIG. 6, physical properties of the binder 46 forming the conductive member 40 are changed in a first temperature-maintained period T1 from an example of time and temperature due to heat applied to the conductive member 40 in a process of coupling the first base material 22 to the second base material 30 via the conductive member 40. In a process of temperature change from the first temperature-maintained period T1 to a second temperature-maintained period T2, the compression crack may occur in the second metal 44, such that an oxide film formed on the surfaces of the first base material 22 and the second base material 30 may be destroyed. In the second temperature-maintained period T2, the first metal 42 may be diffused to the first base material 22 and the second base material 30 through the compression crack. In other words, when temperature is increased to above 100 degrees, physical properties of the binder 46 may be changed during the first temperature-maintained period T1 (while temperature is maintained constant), then temperature is increased further to facilitate occurrence of the compression crack in the second metal 44 and destruction of the oxide film, and while temperature is maintained constant during the second temperature-maintained period T2, the first metal 42 may be diffused to the first base material 22 and the second base material 30 through the compression crack. Moreover, the binder 46 may be cured in the second temperature-maintained period T2.

As described above, in the battery pack according to the disclosure, a compression crack is formed by the second metal included in the conductive member for the electrical connection between the first base material and the second base material in the lead-in front end facing the first base material and the second base material such that the first metal forms a diffusion bond between the first base material and the second base material. The compression crack of the second metal destroys the oxide film formed on the surfaces of the first base material and the second base material and the first metal forms a diffusion bond through the compression crack. Thus, a battery pack having a low manufacturing cost and a superior bonding force may be provided.

The disclosure has been described in detail according to preferred embodiments, but the disclosure is not limited to the above embodiments, and it may be apparent that many variations are possible within the technical spirit of the disclosure by those of ordinary skill in the art.

By way of summation and review, since aluminum is a material that is not solderable, bonding between aluminum elements, e.g., a connection (weld) between a protection circuit and a battery cell, may be realized by applying an additional material between two base materials. However, if the additional material is added and welded to an aluminum tab, the manufacturing costs may increase and complexity of the manufacturing process may increase.

Attempts have been made to bond two aluminum elements by applying an anisotropic conductive film (ACFm) to an electrical connection structure of a secondary battery. The ACFm is a film structure in which synthetic resin (e.g., thermoplastic resin as a binder) and a conductive material (e.g., lead) are mixed with each other, so metal may be plated on an outer side of a polymer ball. However, it may be difficult to implement because of a weak coupling force after bonding with an oxide film of aluminum, which is an electrode material of a secondary battery.

In contrast, one or more embodiments include a battery pack which is practically applicable and has excellent bonding strength by improving a structure of a conductive member as an electrical connection structure of the battery pack. That is, the conductive member includes a binder with metal balls covered with metal shells, such that metal from the metal balls diffuses through cracks in the metal shells to form diffusion bonds.

In other words, in the battery pack according to example embodiments, a compression crack is formed in the second metal included in the conductive member for the electrical connection between the first base material and the second base material, such that the compression crack is formed in the lead-in front end facing the first base material and the second base material to have the first metal form a diffusion bond between the first base material and the second base material through the compression crack. The compression crack of the second metal destroys the oxide film formed on the surfaces of the first base material and the second base material, and the first metal forms a diffusion bond through the compression crack. Thus, a battery pack having a low manufacturing cost and a superior bonding force may be provided.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
- a battery cell, the battery cell including a first base material;
- a protection circuit electrically connected to the battery cell, the protection circuit including a second base material; and
- a conductive member continuously connecting the first base material of the battery cell to the second base material of the protection circuit, the conductive member including:
  - a first metal defining a core; and
  - a second metal defining a shell on an outer side of the core, the second metal including a compression crack at least in a lead-in front end thereof facing the first base material and the second base material, and the first metal extending through the compression crack of the second metal to contact and diffusion bond with the first base material and the second base material.

2. The battery pack as claimed in claim 1, wherein the first metal extends a predetermined a diffusion distance into the first base material and the second base material.

3. The battery pack as claimed in claim 1, wherein the second metal has a high-temperature stability strength or melting point greater than a high-temperature stability strength or melting point of the first metal.

4. The battery pack as claimed in claim 1, wherein the first metal includes lead, and the second metal includes nickel.

5. The battery pack as claimed in claim 1, wherein the compression crack of the second metal is a brittle fracture, the brittle fracture being a result of compression between the first base material and the second base material.

6. The battery pack as claimed in claim 1, wherein the second metal is not thermally fused with the first metal within the first base material and the second base material.

7. The battery pack as claimed in claim 1, wherein the second metal has different values of surface roughness along the outer side of the core.

8. The battery pack as claimed in claim 1, wherein the second metal includes a permeating projection having a relatively high surface roughness in a lead-in front end of the second metal facing the first base material or the second base material.

9. The battery pack as claimed in claim 1, wherein the second metal includes a permeating projection in a lead-in front end thereof facing the first base material or the second base material.

10. A method of manufacturing a battery pack, the method comprising:
- forming a battery cell, the battery cell including a first base material;
- forming a protection circuit, the protection circuit including a second base material; and
- electrically connecting the battery cell to the protection circuit via a conductive member, such that the conductive member continuously connects the first base material of the battery cell to the second base material of the protection circuit, the conductive member including:
  - a first metal forming a core; and
  - a second metal forming a shell on an outer side of the core in which a compression crack is formed at least in a lead-in front end thereof facing the first base material and the second base material, the first metal forming a diffusion bond with the first base material and the second base material through the compression crack of the second metal.

11. The method as claimed in claim 10, wherein the compression crack of the second metal is caused by a brittle fracture according to compression between the first base material and the second base material.

12. The method as claimed in claim 10, wherein the diffusion bond of the first metal with the first base material and the second base material is formed at a temperature less than a melting point of the second metal.

* * * * *